US006441062B1

(12) United States Patent
Mc Kee et al.

(10) Patent No.: US 6,441,062 B1
(45) Date of Patent: Aug. 27, 2002

(54) METHOD FOR PRECIPITATING MICROSUSPENSION POLYMERS

(75) Inventors: Graham Edmund Mc Kee, Neustadt; Bernhard Czauderna, Hirschberg; Harmut Heinen, Mannheim; Jürgen Koch, Neuhofen, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/600,311

(22) PCT Filed: Jan. 19, 1999

(86) PCT No.: PCT/EP99/00306

§ 371 (c)(1),
(2), (4) Date: Aug. 18, 2000

(87) PCT Pub. No.: WO99/37703

PCT Pub. Date: Jul. 29, 1999

(30) Foreign Application Priority Data

Jan. 21, 1998 (DE) .......................................... 198 02 121

(51) Int. Cl.⁷ .................................................. C08J 3/00
(52) U.S. Cl. ....................... 523/200; 523/201; 523/202; 523/205; 523/335; 525/70; 525/71; 525/360
(58) Field of Search ........................... 525/70, 71, 360; 523/200, 201, 202, 205, 335

(56) References Cited

U.S. PATENT DOCUMENTS 4,451,614 A * 5/1984 Flatau .......................... 525/80
5,475,053 A 12/1995 Niessner et al. .............. 525/64
5,631,323 A 5/1997 Güntherberg et al. ......... 525/71
5,889,111 A 3/1999 McKee et al. ................ 525/64

FOREIGN PATENT DOCUMENTS

| CA | 1056975 | | 6/1979 |
| DE | 24 27 960 | | 6/1975 |
| DE | 210697 | * | 6/1984 |
| DE | 3921299 | * | 1/1991 |
| DE | 44 43 886 | | 6/1996 |
| EP | 125 483 | | 11/1984 |
| EP | 510 805 | | 10/1992 |
| EP | 576 960 | | 1/1994 |
| EP | 716 101 | | 6/1996 |
| WO | WO 99/03912 | | 1/1999 |

OTHER PUBLICATIONS

Encyclopedia of Polymer Science & Eng., vol. 6 (1986) p. 1.

Encyclopedia of Polymer Science & Eng., vol. 5 (1966) pp. 816–819.

P. Lovell et al. "Emulsion Polymerization and Emulsion Polymers" (1997) pp. 224–227.

* cited by examiner

Primary Examiner—Jeffrey Mullis
(74) Attorney, Agent, or Firm—Keil & Weinkauf

(57) ABSTRACT

In a process for precipitating microsuspension polymers from a suspension comprising them, a polymer dispersion prepared by emulsion polymerization is added to the suspension.

9 Claims, No Drawings

METHOD FOR PRECIPITATING MICROSUSPENSION POLYMERS

The invention relates to a process for precipitating microsuspension polymers, to the polymers thus precipitated, to their use for modifying molding compounds, and to molding compounds comprising them.

For the preparation of small addition-polymer particles, which are used in particular as a rubber component in polymer blends, a variety of processes are known.

For example, the polymer particles may be prepared by the microsuspension process. In this procedure a liquid monomer or liquid monomer mixture that is to be polymerized to the particulate polymer is mixed with water and a protective colloid. The preferably water-insoluble polymerization initiator is added even at this point or only after the monomers have been dispersed, and if appropriate after the dispersion has been heated. Intensive stirring at high speed and high shear produces, from the heterogeneous mixture, a dispersion of very small monomer droplets in water. Intensive mixers of any desired construction are used for this purpose. The polymerization is started by heating the dispersion and continued, with moderate stirring in which the droplets are not broken up any further, until a desired conversion has been reached. By adding different monomers at specific times it is possible to obtain core-shell polymer particles, known as graft polymers. The protective colloids used to stabilize the dispersion are generally water-soluble polymers which envelop the monomer droplets and the polymer particles formed from them and so protect against coagulation.

The preparation of particulate microsuspension polymers is described, for example, in DE-A-44 43 886.

If the microsuspension polymers obtained are to be used to modify polymer molding compounds, they are frequently incorporated into the polymers with heating in the form of an aqueous dispersion, with the dispersion medium evaporating. Precipitating the polymer dispersion is difficult, since customary precipitants used for emulsion polymers are ineffective.

One process for producing solid microsuspension polymers is that of spray drying. In the case of this costly process, however, all of the auxiliaries present in the dispersion remain in the spray-dried product. This may lead to the formation of gel specks, to discoloration, or to premature aging.

It is an object of the present invention to provide a process for precipitating microsuspension polymers from a suspension comprising them.

We have found that this object is achieved in accordance with the invention by a process for precipitating microsuspension polymers from a suspension comprising them, where a polymer dispersion prepared by emulsion polymerization is added to the suspension.

In addition, a precipitant for the polymer dispersion may also be added to the suspension. In this case it is possible first to mix the suspension with the polymer dispersion and then to add the precipitant, or to mix the suspension with the precipitant and then to add the polymer dispersion.

It has been found in accordance with the invention that when a polymer dispersion prepared by emulsion polymerization is added it is possible to precipitate microsuspension polymers.

Emulsion polymerization is a heterogeneous reaction procedure in which unsaturated monomers or monomer solutions are emulsified in a continuous phase, generally water, with the aid of an emulsifier system and are polymerized using initiators which form free radicals. The free-radical initiators are preferably soluble in water. The product is a colloidal dispersion of the polymer or polymer solution, known as a latex. In the course of the reaction the emulsifier system forms micelles into which the at least partially water-soluble monomers from the emulsified monomer droplets migrate through the aqueous phase. With the aid of initiators present in the aqueous phase, polymerization is initiated in the micelles. The monomers used must have a certain water solubility in order to be able to migrate from the monomer droplets through the aqueous phase into the micelles. Examples of monomers which can be used are styrene, butadiene, acrylic acid, vinyl chloride, acrylonitrile, and others. A process to this effect is described in Encyclopedia of Polymer Science and Engineering, Volume 6, page 1 (1986), John Wiley and Sons, New York.

Emulsifiers which can be used in this case are anionic, cationic, nonionic or amphoteric surface-active compounds, especially soaps. It is preferred to use anionic or cationic soaps such as salts of long-chain carboxylic acids or sulfonic acids. Examples are sodium, potassium and ammonium salts of $C_{12-30}$ fatty acids such as stearic and oleic acid and also the salts of $C_{10-30}$ sulfonates, for instance, sodium alkylbenzenesulfonates (LAS) and similar compounds derived from fatty acid radicals. One particularly preferred example is sodium lauryl sulfate. Suitable cationic soaps are, in particular, salts of long-chain amines or polyamines and also quaternary ammonium salts or amines of long-chain polyoxyethylenes and quaternized derivatives thereof, and also amine oxides. Suitable emulsifiers are described in "Emulsion Polymerisation and Emulsion Polymers", Ed. P. A. Lovell, M. S. El-Aasser, John Wiley and Sons, Chichester (1997), pages 224 to 226. Reference may also be made to the Encyclopedia of Polymer Science and Technology, Volume 5, pages 816 to 819 (1966), John Wiley and Sons.

For the preparation of the emulsion polymers, the emulsifiers are used in an amount of from 0.1 to 10% by weight, preferably from 0.15 to 5% by weight, with particular preference from 0.2 to 2.0% by weight, based on the monomers to be emulsified. Examples of suitable water-soluble initiators are hydrogen peroxide and potassium, ammonium and sodium peroxides.

Processes for preparing the emulsion polymers, and emulsion polymers that can be used, are described, for example, in DE-A-24 27 960, EP-A-0 125 483, EP-A-0 716 101, and EP-A-0 576 960. Preferably, the emulsion polymer is composed of the same monomers used to prepare the microsuspension polymers described below.

Emulsion polymers may be precipitated by adding suitable precipitants, which disrupt the dispersion of the polymer particles. For example, electrolytes such as calcium chloride or magnesium sulfate are added to the dispersions. In general, it is possible to use salts which comprise a polyvalent cation. Furthermore, acids may be used. The treatment with the precipitant, preferably in the form of an aqueous solution, leads to coagulation of the polymer particles, which can then be separated from the dispersion medium, generally water. A procedure to this effect is described in DE-A-24 27 960.

In the same way as the nature of the emulsion polymer to be used is not critical and may be chosen freely, the nature of the microsuspension polymer to be used in accordance with the invention is also freely selectable and not restricted. Suitable microsuspension polymers are described, for example, in DE-A-44 43 886.

A suitable polymer is, for example, an elastomeric microsuspension polymer A' having an average particle diameter of from 0.08 to 100 μm.

The morphological structure of the particles can be chosen arbitrarily; for example, the particles may have a uniform composition or may consist of a core with one or more graft shells. The particles may be crosslinked or uncrosslinked and may consist of polymers possessing a glass transition temperature ($T_g$) of less than 0° C. (rubber-containing) or of more than 0° C. (brittle). It is also possible—in the case, for example, of particles having a core/shell structure—for there to be two or more phases, some phases having a glass transition temperature of more than 0° C. and other phases having a glass transition temperature of less than 0° C.

Suitable monomers for preparing the microsuspension polymers (MSPs) are those monomers which may be polymerized using free radicals. Examples of such monomers are $C_{1-36}$ alkyl (meth)acrylates such as butyl acrylate and ethylhexyl acrylate, which lead to soft monomers, and also methyl methacrylate, ethyl acrylate, and methyl acrylate. Further monomers are styrene, acrylonitrile, α-methylstyrene, and also unsaturated carboxylic acids such as (meth)acrylic acid and their derivatives such as glycidyl (meth)acrylate and (meth)acrylamide. Further suitable monomers are dienes such as butadiene or isoprene, which may if desired be substituted. A comprehensive description of suitable monomers is given in Polymer Handbook, $3^{rd}$ edition, 1989, published by Wiley Int. Science.

One particular type of suitable monomers are those known as crosslinkers. Bifunctional or polyfunctional comonomers of this kind are, for example, the above-described monomers butadiene and isoprene, and also vinyl esters of dicarboxylic acids such as of succinic acid and adipic acid, the allyl and divinyl ethers of bifunctional alcohols such as ethylene glycol and 1,4-butanediol, the esters of acrylic acid and methacrylic acid with said bifunctional alcohols, and also 1,4-divinylbenzene and triallyl cyanurate. Particular preference is given to the acrylic ester of tricyclodienyl alcohol (dihydrodicyclopentadienyl acrylate) and the allyl esters of acrylic acid and of methacrylic acid. Further suitable crosslinkers are described in Ullmann's Encyklopadie der technischen Chemie, $4^{th}$ edition, Volume 19, pages 1 to 30.

The compounds of the invention are obtained in a process for preparing microsuspension (graft) polymers by
(1) dispersing the monomers corresponding to the microsuspension polymer in water using a protective colloid, to give a dispersion having an average particle diameter of from 0.08 to 100 μm,
(2) polymerizing the droplets using a hydrophobic free-radical polymerization initiator,
and, if desired, after or during stage (2),
(3) graft-polymerizing the mixture obtained in stage (2) with further monomers.

The process of microsuspension polymerization is described, for example, in EP-A-0 716 101 and DE-A-44 43 886.

In the microsuspension process, monomer droplets are suspended in an aqueous medium in the presence of a protective colloid with high shear forces. Subsequently, they are subjected to free-radical polymerization. The resultant particle sizes are, in accordance with the invention, from 0.08 to 100 μm, preferably from 0.15 to 50 μm, with particular preference from 0.2 to 30 μm.

The elastomeric microsuspension (graft) polymers may have a core/shell structure or may be configured as homogeneous particles.

The graft shell may have the same composition as the core and may be composed at least in part of monomers of elastomeric polymers. The structure of the graft polymers may be multistage; in other words, two or more graft shells may be present. For example, adjacent a soft core there may be a hard shell, a hard and a soft shell, or a sequence of hard and soft shells. Examples of monomers which give a hard phase are styrene, α-methylstyrene, acrylonitrile, methacrylonitrile, (meth)acrylic esters, especially methyl (meth)acrylate. Further suitable monomers are specified in Ullmann's Encyklopadie der technischen Chemie, $4^{th}$ edition, Volume 19, pages 1 to 30. The polymer of the graft shell is composed preferably of acrylonitrile and/or styrene with or without a crosslinker. The crosslinkers for the core and the graft shell have been described above.

The microsuspension (graft) polymers of the invention are obtained preferably as follows: the liquid monomer or liquid monomer mixture is mixed with water and a protective colloid and also, if desired, with an emulsifier. The polymerization initiator is added either at this stage as well or not until after the monomer has been dispersed, or else after the dispersion has been heated. A dispersion of very small monomer droplets in water is obtained from the heterogeneous mixture by intensive high-speed stirring. Intensive mixers of any desired construction are suitable for mixing. The desired particle size within the range according to the definition may be determined, for example, by preparing optical micrographs and counting the number of particles which have a particular diameter.

The polymerization is started by heating the dispersion. The reaction is then carried out with moderate stirring—that is, stirring which does not result in further division of the droplets.

During or after this polymerization stage, it is possible if desired to continue the reaction, in a conventional manner, with the monomers from which the corresponding shells are formed.

The monomers are dispersed generally at a temperature of from 0 to 100° C., preferably at room temperature. The ratio of monomer to water is generally from 75:25 to 10:90 parts by weight.

The protective colloids used to stabilize the dispersion are water-soluble polymers which envelop the monomer droplets and the polymer particles formed from them and so protect them against coagulation.

Suitable protective colloids are cellulose derivatives such as carboxymethylcellulose and hydroxymethylcellulose, poly-N-vinylpyrrolidone, polyvinyl alcohol and polyethylene oxide, anionic polymers, such as polyacrylic acid, and cationic polymers such as poly-N-vinylimidazole. The amount of the protective colloids is preferably from 0.1 to 5% by weight, based on the overall mass of the (core) monomers. The reaction may additionally be carried out in the presence of emulsifiers. For this purpose it is possible, as elucidated above in connection with the emulsion polymers, to use low molecular mass surface-active compounds, examples being those of the type of the anionic or cationic soaps. In particular it is possible to use alkali metal salts, especially sodium salts of $C_{12-18}$ paraffinsulfonic acid. When using emulsifiers, the proportion of the protective colloid is preferably from 0.1 to 5% by weight and that of the emulsifier from 0.005 to 5% by weight, based in each case on the overall mass of the (core) monomers. The additional use of the emulsifier results in the formation of relatively small particles.

Suitable polymerization initiators are those which form free radicals, especially those which are soluble in the monomers and have a half-life of preferably 10 hours at a temperature of between 25 and 150° C. Examples of suitable initiators are peroxides such as dilauroyl peroxide, peroxosulfates, tert-butyl perpivalate, and azo compounds, for example, azodiisobutyronitrile. The use of different initiators for preparing the graft core and the graft shells is possible. The amount of the initiators is generally from 0.05 to 2.5% by weight, based on the amount of the monomers.

Furthermore, the reaction mixture preferably includes buffer substances, such as $Na_2HPO_4/NaH_2PO_4$ or Na citrate/citric acid, in order to establish a pH which remains essentially constant. In the course of the polymerization, especially that of the monomers which constitute the shells, moreover, it is common to add molecular weight regulators such as ethylhexyl thioglycolate or dodecyl mercaptan.

The polymerization temperature of the core monomers is generally from 25 to 150° C., preferably from 50 to 120° C. The grafting of the shells is generally performed at a temperature of from 25 to 150° C., preferably from 50 to 120° C. The lower limits of these ranges correspond to the decomposition temperatures of the polymerization initiators that are used in each case. the precipitation, according to the invention, of the microsuspension polymers from a suspension comprising them, especially an aqueous suspension, a polymer dispersion prepared by emulsion polymerization as described above, especially an aqueous polymer dispersion, is added to the suspension. The weight ratio of the solids in the suspension and the polymer dispersion is from 1:99 to 99:1, preferably from 1:99 to 95:5, with particular preference from 1:99 to 90:10.

By using the polymer dispersion of the emulsion polymer, the microsuspension polymer is precipitated from the suspension. The precipitation can be improved or accelerated if, in addition, a precipitant for the polymer dispersion is added, as described above. The precipitant is preferably used in the form of an aqueous solution. The concentration of the precipitant in the aqueous phase of the overall reaction mixture during the precipitation is preferably from 0.01 to 20% by weight, with particular preference from 0.05 to 15% by weight, in particular from 0.1 to 10% by weight. The amount of the precipitant (calculated without the water fraction), based on the solids in the suspension and the polymer dispersion, is preferably from 0.01 to 20% by weight, with particular preference from 0.05 to 10% by weight, in particular from 0.1 to 8% by weight.

The temperature during the precipitation is preferably from 0 to 150° C., with particular preference from 10 to 110° C., in particular from 20 to 100° C. It is also possible to carry out precipitation at one temperature and then to carry out further treatment at another temperature.

The precipitation is preferably conducted at a pH less than 7, preferably less than 6. In this case it is possible, as indicated above, first to add the precipitant to the suspension of the microsuspension polymer and then to add the polymer dispersion of the emulsion polymer to the suspension. Alternatively, first the polymer dispersion of the emulsion polymer may be added to the suspension of the microsuspension polymer, and then the precipitant may be added to the suspension. The precipitated polymers may be separated from the aqueous dispersion medium by any desired, suitable methods, such as filtration or centrifugation. The polymers may be washed before or during separation. In this way it is possible to prevent all of the auxiliaries used in preparing the microsuspension polymers and emulsion polymers from remaining in the precipitated polymers. By this means it is possible to obtain microsuspension polymers which are largely free from disruptive auxiliaries, so that they may be used with advantage in the preparation of molding compounds. Consequently, no gel specks are formed, nor is there any discoloration or premature aging of the molding compounds. Molding compounds may be made matte (flatted) by incorporating the precipitated polymers. At the same time, the toughness of the molding compounds may be improved. In addition to very good flatting, the molding compounds also have advantageous mechanical properties, which cannot be achieved, for example, using inorganic flatting agents. Where the molding compound is blended with an emulsion rubber, such as ASA or ABS, for example, the rubber dispersion used for this purpose may be used in the context of the precipitation of the invention. Following the precipitation, the emulsion polymer is then incorporated together with the microsuspension polymer into the molding compounds. The polymer dispersion of the emulsion polymer may be added in the same amount in which the emulsion polymer is to be present in the subsequent molding compound.

The polymers obtained by the precipitation process of the invention may be used to modify molding compounds.

The invention additionally provides a molding compound comprising the components A to D, whose overall weight is 100% by weight:
  a: from 0.5 to 99% by weight of at least one polymer obtained by the precipitation process of the invention, as described above, as component A,
  b: from 1 to 99.5% by weight of a polymer matrix such as polyester, polyamide, polycarbonate, polyoxymethylene, preferably a polymer of styrene, a-methylstyrene, acrylonitrile, methacrylonitrile, (meth)acrylic esters or mixtures thereof, as component B,
  c: from 0 to 50% by weight of fibrous or particulate fillers or mixtures thereof, as component C, and
  d: from 0 to 40% by weight of further additives as component D.

On the one hand, the addition improves the impact strength; on the other hand, induced by diffuse reflection (scattering) of the light at the large particles, molding compounds having reduced surface gloss are obtained as, accordingly, are matte moldings.

The elastomeric particles A are incorporated into the melt of the matrix B, so that the resultant molding compound is composed of the thermoplastic matrix B and the polymers A dispersed therein. It has proven advantageous to make the outer graft shell compatible, or partly compatible, with the matrix polymer B. Often this is achieved by the graft shell being of the same, or a very similar, material as the base polymer. Examples of industrially important base polymers are homopolymers of styrene, of methyl acrylate, of $C_{1-C4}$ alkyl methacrylates and acrylonitrile, copolymers of these monomers and further comonomers such as methacrylonitrile; in other words, these monomers and monomer mixtures are suitable, depending on the structure of the base polymer B, for constructing the outer graft shell.

If, for example, the outer shell is to be relatively hard, intermediate shells composed of a less hard material may be advisable. Furthermore, the first, hard graft shell may be followed by a shell of soft material, such as the core material, as a result of which the properties of the thermoplastic molding compounds prepared from B and the graft polymer particles A, and those of the moldings produced therefrom, may in many cases be improved still further. The relationships between the nature of both components in the molding compounds and the properties of the material correspond to those known for the base material and for graft polymers prepared by emulsion polymerization (preferably, the microsuspension polymer and the emulsion polymer are composed of the same monomers in core and shell).

This also applies to base materials B other than those mentioned; for example, to copolymers of 1,1-diphenylethylene with styrene, for example, polyesters, polyamides, polyvinyl chloride, polycarbonates, and polyoxymethylene. In such cases, compatible and partly compatible graft shells may be determined readily by means of a few preliminary experiments.

By compatibility is meant the miscibility at the molecular level. One polymer is regarded as being compatible with another if the molecules of both polymers in the solid state are distributed randomly, i.e., if the concentration of one polymer along any given vector neither increases nor decreases. Incompatibility prevails, conversely, if in the solid state two phases are formed which are separated from one another by a sharply defined phase boundary. Along a vector which intersects the phase boundary, the concentration of one polymer increases suddenly from 0 to 100% and that of the other decreases from 100% to 0.

The transitions between the two extremes are fluid. They have the feature that a phase boundary, although one is formed, is not sharply defined. At the interface there is mutual partial penetration of the two phases. Accordingly, the concentration of one polymer along a vector which intersects the phase boundary increases more or less rapidly from zero to 100% and that of the other polymer decreases more or less rapidly from 100% to zero.

In this latter case the term partial compatibility is also used, and this frequently occurs in industrially important polymers.

Examples of partly compatible polymers are the duos polymethyl methacrylate/copolymer of styrene and acrylonitrile, polymethyl methacrylate/polyvinyl chloride, and polyvinyl chloride/copolymer of styrene and acrylonitrile, and also the three-phase system of polycarbonate/polybutadiene/copolymer of styrene and acrylonitrile (=polycarbonate/ABS).

More on the concept of the compatibility of the polymers and, in particular, on the solubility parameter as a quantitative measure is to be found, for example, in the Polymer Handbook, eds. J. Brandrup and E. H. Immergut, $3^{rd}$ edition, Wiley, New York 1989, pp. VII/519–VII/550.

For impact modification, the polymers of the invention are used generally in amounts of from 1 to 60% by weight, preferably from 2 to 45% by weight, based on the amount of their mixture with the base polymer. Moldings formed from such mixtures are highly light-scattering and therefore range from being particularly matte to opaque.

Where a flatting effect coupled with high transparency is desired, concentrations of from 2 to 10% by weight of the graft polymers are advisable. Since these low concentrations would bring about only a relatively small increase in the impact strength, it is possible in this case to use conventional, very finely divided, elastomeric modifiers as well in the amounts customary for this purpose, with subtraction of the amount of graft polymer of the invention that is employed as flatting agent.

It is further possible to impart a matte appearance to opaque polymers which already include impact modifiers, examples being polybutadiene-modified styrene-acrylonitrile copolymer (=ABS), polyalkyl acrylate-modified styrene-acrylonitrile copolymer (=ASA), or ethylene-propylene-diene monomer (EPDM)-modified styrene-acrylonitrile copolymer (=AES), by using the graft polymers of the invention as well.

The particles of the invention achieve a flatting effect without markedly impairing the mechanical properties, as is observed in the case of conventional flatting agents such as chalk or silica gel.

Furthermore, the molding compounds modified with the particles of the invention, and the moldings produced from them, have the advantages of improved printability and what are known as antiblocking properties; that is, the surfaces of the moldings, "roughened" by the particles, do not adhere to one another. This adhesion-based effect is known, for example, for polymer films. Films of the invention, comprising particles and placed on top of one another to form a stack, may be separated from one another without problems, in contrast to films from which such particles are absent.

As component C, the molding compounds may comprise fibrous or particulate fillers. Examples of such fillers are polymer fibers or glass fibers, such as E, A or C glass fibers. They may preferably have been treated with a size and an adhesion promoter. Further suitable fillers and reinforcing agents are glass beads, mineral fibers, whiskers, alumina fibers, mica, quartz flour, and wollastonite.

The molding compounds may further include additives of all kinds as component D. Examples that may be mentioned include lubricants and mold release agents, pigments, flame retardants, dyes, stabilizers, and antistats, each of which are added in the customary amounts.

The molding compounds of the invention may be prepared by conventional mixing techniques—for example, by incorporating the particulate graft polymer into the base material at temperatures above the melting point of the base material, in particular at temperatures from 150 to 350° C., in customary mixing equipment. From the molding compounds of the invention it is possible to produce films, fibers and moldings having reduced surface gloss (mattness) and high impact strength. There is no separation of the polymer components within the films, fibers and moldings.

The invention is illustrated below with reference to examples.

The following dispersions were prepared:

Microsuspension Dispersion D1

The batch below was stirred under nitrogen with a Dispermat at 7000 rpm for 20 minutes. The Dispermat was from VMA-Getzmann GmbH, D-51580 Reichshof, and had a 5 cm toothed disk.

Batch:

1359.3 g of water 200.0 g of a 10% strength polyvinyl alcohol (PVA) solution in water (PVA: degree of hydrolysis 88 mol %, viscosity of a 4% strength solution in water at 20° C. is 8 mPa/s in accordance with DIN 53015-Mowiol®8–88 from Hoechst)

980.0 g of n-butyl acrylate 20.0 g of dihydrodicyclopentadienyl acrylate 5.0 g of dilauryl peroxide 100 g of this dispersion were introduced into a moderately stirred (250 rpm) glass flask under nitrogen at 65° C. and subjected to partial polymerization. The remainder of the dispersion was metered in over a period of 100 minutes. Polymerization was continued for 60 minutes. Then 254.1 g of water, 330.6 g of styrene and 110.2 g of acrylonitrile were added, the monomers being added as a feed stream over 40 minutes. Subsequently, stirring was continued at 65° C. for 120 minutes.

The average particle size was 2.5 µm.

Microsuspension Dispersion D2

D2 was prepared like D1 except that the peroxide was added in the form of a 10% strength solution in cyclohexane to the emulsified mixture.

Polymer Dispersion Prepared in Emulsion—D3

Elastomeric graft polymer (core: crosslinked polybutyl acrylate; shell: styrene-acrylonitrile copolymer), weight-average particle diameter approximately 90 nm Preparation of a Seed Latex To prepare a seed latex, 16 g of butyl acrylate and 0.4 g of tricyclodecenyl acrylate in 150 g of water were heated with stirring at 60° C. with the addition of 1 g of the sodium salt of a $C_{12}$–$C_{18}$ paraffinsulfonic acid, 0.3 g of potassium persulfate, 0.3 g of sodium hydrogen carbonate, and 0.15 g of sodium pyrophosphate. 10 minutes after the onset of the polymerization reaction, a mixture of 82 g of butyl acrylate and 1.6 g of tricyclodecenyl acrylate was added over the course of 3 hours. After the end of the addition of monomer, reaction was allowed to continue for one hour. The resulting latex had a solids content of 40% and a weight-average particle size $d_{50}$ of 76 nm. The particle size distribution was narrow (quotient Q=0.29).

Preparation of the Graft Polymer 150 g of the polybutyl acrylate seed latex were mixed with 40 g of a mixture of styrene and acrylonitrile (weight ratio 75:25) and 60 g of water and, following the addition of a further 0.03 g of potassium persulfate and 0.05 g of lauroyl peroxide, this mixture was heated at 65° C. for 4 hours with stirring. The resulting polymer dispersion was processed further as such. The degree of grafting of the graft copolymer was 40%, and the particles had a weight-average diameter $d_{50}$ of 90 nm.

Polymer Dispersion Prepared in Emulsion—D4

Elastomeric graft polymer, prepared conventionally by emulsion polymerization. Type: 60% n-butyl acrylate, crosslinked with tricyclodecenyl acrylate (core)/30% styrene +10% acrylonitrile (shell), average particle diameter $D_{50}$ approximately 0.5 μm.

The precipitation experiments below were conducted, in which the stated solutions were combined. Unless specified otherwise, the concentration of the solution of $MgSO_4$ was 1% in water.

COMPARATIVE EXAMPLE C1

2 parts by weight $MgSO_4$ solution in water +1 part by weight D2 at 23° C.

Result: no precipitation.

EXAMPLE 2

1 part by weight D2 and 1 part by weight D3 at 23° C.

Result: virtually complete precipitation.

EXAMPLE 3

1 part by weight D2+1 part by weight D3+2 parts by weight $MgSO_4$ solution

Result: virtually complete precipitation at 23° C.

Heated at 85° C. for 30 minutes.

Result: complete precipitation.

EXAMPLE 4

3 parts by weight $MgSO_4$ solution at 85° C. +1 part by weight of a mixture of D2 and D3 (2:1).

Result: virtually complete precipitation, supernatant solution slightly cloudy.

EXAMPLE 5

4 parts by weight $MgSO_4$ solution at 85° C. +a mixture of 1 part by weight D2 and 1 part by weight D4.

Result: complete precipitation.

EXAMPLE 6

75 parts by weight D3+100 parts by weight D1 at 85° C.

Result: precipitation, but supernatant solution is cloudy.

EXAMPLE 7

12.5 parts by weight D3+100 parts by weight D1+50 parts by weight $MgSO_4$ solution (2% strength) at 85° C.

Result: precipitation, supernatant solution almost clear.

EXAMPLE 8 parts by weight D3+100 parts by weight D1+50 parts by weight $MgSO_4$ solution (2% strength) at 85° C.

Result: precipitation, supernatant solution almost clear.

EXAMPLE 9

0 parts by weight D3+100 parts by weight D1+50 parts by weight $MgSO_4$ solution (2% strength) at 85° C.

Result: precipitation, supernatant solution clear.

EXAMPLE 10

75 parts by weight D3+100 parts by weight D1+50 parts by weight $MgSO_4$ solution (2% strength) at 85° C.

Result: precipitation, supernatant solution clear.

Incorporation into Thermoplastics

After drying, it was possible to incorporate the precipitated powders into a polystyrene-acrylonitrile copolymer with the aid of an extruder.

We claim:

1. A process for precipitating microsuspension polymers comprising polymers having a glass transition temperature ($T_g$) of less than 0° C., or in there are two or more phases, some of which have a glass transition temperature of below 0° C., from a suspension comprising them, which comprises adding a polymer dispersion prepared by emulsion polymerization to the suspension, wherein the emulsion polymer is composed of the same monomers as are used to prepare the microsuspension polymers.

2. A process as claimed in claim 1, wherein a precipitant for the polymer dispersion is also added to the suspension.

3. A process as claimed in claim 2, wherein said precipitant is a salt which comprises a polyvalent cation.

4. A process as claimed in claim 2, wherein said precipitant is an acid.

5. A process as claimed in claim 2, wherein said precipitant is used in the form of an aqueous solution.

6. A process as claimed in claim 1, wherein the weight ratio of the solids in the suspension and the polymer dispersion is from 1:99 to 99:1.

7. A process as claimed in claim 1, wherein the precipitation is conducted at a pH of less than 6.

8. A precipitated microsuspension polymer prepared by a process as claimed in claim 1.

9. A molding compound comprising the components A to D, whose overall weight is 100% by weight:

a: from 0.5 to 99% by weight of a precipitated microsuspension polymer as claimed in claim 8, as component A, b: from 1 to 99.5% by weight of a polymer matrix as component B, c: from 0 to 50% by weight of fibrous or particulate fillers or mixtures thereof, as component C, and d: from 0 to 40% by weight of further additives as component D.

* * * * *